United States Patent
Nadig et al.

(10) Patent No.: US 12,008,995 B2
(45) Date of Patent: Jun. 11, 2024

(54) GENERATING EVENT OUTPUT

(71) Applicant: Amazon Technologies, Inc., Seattle, WA (US)

(72) Inventors: Vinaya Nadig, Bothell, WA (US); Ambika Babuji, Fremont, CA (US); Zhuxuan Li, Seattle, WA (US); He Lu, Kirkland, WA (US); Elad Refael Kassis, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 17/719,563

(22) Filed: Apr. 13, 2022

(65) Prior Publication Data

US 2022/0358930 A1   Nov. 10, 2022

Related U.S. Application Data

(63) Continuation of application No. 16/775,247, filed on Jan. 28, 2020, now Pat. No. 11,322,150.

(51) Int. Cl.
*G10L 15/26* (2006.01)
*G10L 15/14* (2006.01)

(52) U.S. Cl.
CPC ............ *G10L 15/26* (2013.01); *G10L 15/146* (2013.01)

(58) Field of Classification Search
None
See application file for complete search history.

(56) References Cited

U.S. PATENT DOCUMENTS

| | | | |
|---|---|---|---|
| 9,318,108 B2 | 4/2016 | Gruber et al. | |
| 10,402,450 B2 * | 9/2019 | Goodman | G06F 16/243 |
| 11,037,558 B2 * | 6/2021 | Trim | G10L 15/1815 |
| 11,334,383 B2 * | 5/2022 | Rakshit | G06F 9/453 |
| 2012/0010805 A1 * | 1/2012 | Wilkerson | G06Q 10/109 |
| | | | 701/538 |
| 2014/0074483 A1 * | 3/2014 | van Os | G10L 15/22 |
| | | | 704/275 |
| 2017/0099592 A1 * | 4/2017 | Loeb | G06Q 10/107 |
| 2017/0149716 A1 * | 5/2017 | Mostachetti | H04L 51/52 |
| 2017/0359463 A1 | 12/2017 | Segalis et al. | |
| 2018/0020093 A1 * | 1/2018 | Bentitou | G10L 13/00 |
| 2020/0302356 A1 * | 9/2020 | Gruber | G06Q 10/06316 |

OTHER PUBLICATIONS

International Preliminary Report on Patentability mailed on Aug. 11, 2022 for International Patent Application No. PCT/US2021/012144, filed Jan. 5, 2021.

* cited by examiner

*Primary Examiner* — Stella L. Woo
(74) *Attorney, Agent, or Firm* — Pierce Atwood LLP

(57) ABSTRACT

A system is provided for determining subscription data when a user requests to receive an output in the future when an event occurs. The system may determine an output type based on the capabilities of the output device and a trigger type. The system may determine a trigger type based on the priority of the triggering event. The system may also determine how many times the subscription is to be executed. Using this information, the system creates the subscription so that the user may receive a notification or an announcement when an event occurs.

20 Claims, 11 Drawing Sheets

FIG. 6

| User Identifier | Trigger | Trigger Type | Recurrence | Output Device | Output Type |
|---|---|---|---|---|---|
| ABC | EmailReceived | High | Once | Smart Speaker | Audio / TTS |
| ABC | PrescriptionReady | Medium | Twice | Mobile Device | Push Notification |
| BCD | SportsStart | Low | Next two Saturdays and Sundays | Smart TV | Error |
| CDE | WeatherCondition | Medium | Each time for 7 days | Mobile Device | Push Notification |
| | | | | Smart Speaker | Visual Notification |
| CDE | SevereWeatherAlert | High | Each time | Smart Speaker | Audio / TTS |
| | | | | Mobile Device | Push Notification |

602 — ABC row
604 — ABC row
606 — BCD row
608 — CDE (WeatherCondition) row
610 — CDE (SevereWeatherAlert) row Subscription Storage 455

GENERATING EVENT OUTPUT

CROSS REFERENCE TO RELATED APPLICATION

This application is a continuation of, and claims the benefit of priority of, U.S. Non-Provisional patent application Ser. No. 16/775,247, filed Jan. 28, 2020, and entitled "GENERATING EVENT OUTPUT," the content of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a conceptual diagram illustrating how subscription data representing a created subscription may be stored according to embodiments of the present disclosure.

DETAILED DESCRIPTION

Figure 1:
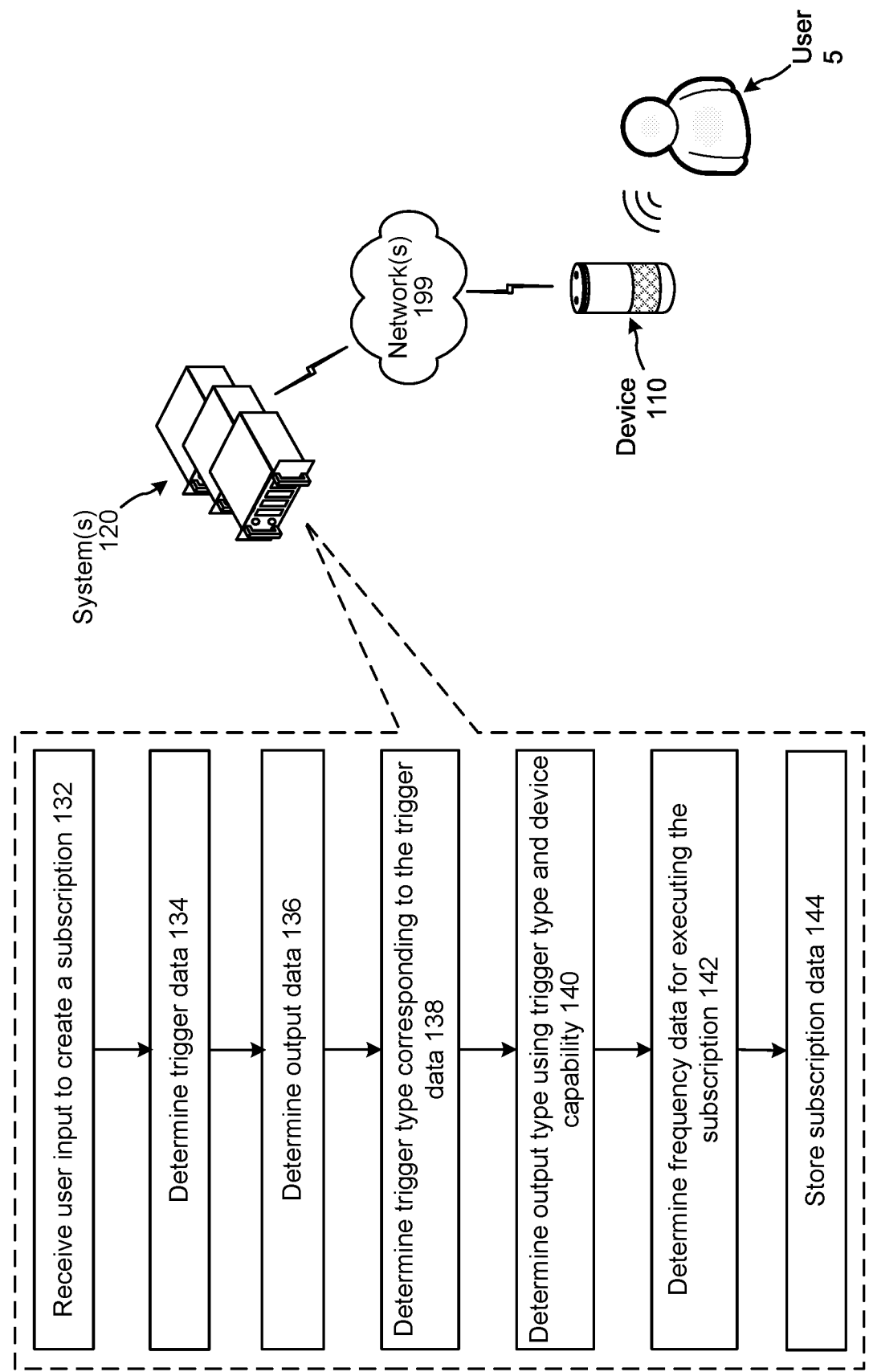
FIG. 1 illustrates a system configured to create a subscription based on a user input according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may receive a user input requesting the system to perform a particular action when a particular event occurs in the future. Thus a user may subscribe to a service whereby the system may detect an event and may generate some output indicating to the user that the event occurred. The form of the output may be specified by the user, but in certain instances the system may proactively determine the form of the output depending on the type of the event, the event priority, the present activity of the user and/or other factors such as device capability or the like. For example, the system may determine a certain event calls for an interruption to a user even while the user is engaged in another activity (such as watching content on a device such that the system interrupts the content playback to output information about the event) while a different event may call for a more latent notification, such as a message to a companion application on a user's mobile device that the user may notice later rather than causing an interruption to the user's content watching. The system may thus create proactive experiences in response to such user requests that cause the system to generate and store subscription data to later generate proactive outputs (such as notifications, reminders, or other outputs as explained below) when the event occurs. For example, a user input may be "Alexa, tell me when I receive an email from Joe," and the system may create and store subscription data that causes the system to generate and send an output (e.g., a notification) to the user when the event of receiving an email from Joe occurs. Another user input may be "tell me when the Seahawks play," and the system may create and store a subscription that causes the system to generate and send an output to the user when the event (the Seahawks game) occurs. The stored subscription may also indicate the output type, which device(s) receive the output, recurrence type of the output, and other data used to present the output to the user. Alternatively or in addition, the system may determine such information using default settings or machine learning approaches to make dynamic determinations regarding such items.

The improved system of the present disclosure determines an output type for the subscription based on conditions such as the capabilities of an output device, a trigger type for the subscription based on whether the event time is determinable or unknown, and/or other information such as user activity at the time of the output. The system also determines recurrence information for the subscription to determine how many times the subscription is to be executed. (Although the term subscription is uses herein to describe a user registering for a notification, such subscription may be for a one-time single event or for a recurring event.) Using this information, the system creates a subscription and provides a confirmation to the user that the subscription has been created. The confirmation may include information related to the subscription. For example, if the system determines that the output type for the subscription is an audio output, then in confirming the creation of the subscription the system may output "I will announce when you receive an email from Joe." When the system determines the output type to be a push notification, the system may output "I will notify you when you receive an email from Joe."

When the time of the event is determinable, such as the start of a TV program or a sporting event, then the system may determine the trigger type to be a reminder, and in confirming the creation of the subscription the system may output "I'll remind you when (or before) the show starts." When the time of the event is not pre-determinable, such as receiving an email or a prescription being ready, then the system may determine the trigger type to be a notification, and in confirming the creation of the subscription the system may output "I'll notify you when the prescription is ready."

The system may also confirm the recurrence of the subscription. For example, if the user input is "tell me every time I receive an email from Joe," then the system may create a subscription accordingly and may output the confirmation "I will tell you each time you receive an email from Joe." The system may determine whether a triggering event can occur once or can occur on a recurring-basis. If the event only occurs once (e.g., opening ceremony of the 2020 Summer Olympics), then the system creates a subscription that is executed once. If the event can recur, then the system may determine if the user's intent is to create a one-time subscription or a recurring subscription.

FIG. 1 illustrates a system configured to create a subscription for a user input according to embodiments of the present disclosure. Although the figure and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199.

The system(s) 120 receives (132) user input to create a subscription. The user input may be audio data representing an utterance spoken by the user 5 and captured by the device 110. The system(s) 120 may perform automatic speech recognition (ASR) processing on the audio data to determine text data corresponding to the user input. In some embodiments, the user input may be text data or another form of data. The system(s) 120 may perform natural language understanding (NLU) on the text data/user input to determine the user's intent to create a subscription to receive an output in the future when an event occurs. For example, the user input may be "tell me when I receive an email from Joe", "tell me when the Seahawks play", "remind me to close the windows every time it rains", etc.

The system(s) 120 determines (134) trigger data corresponding to the subscription. The trigger data represents a triggering event that causes generation of the output data. The system(s) 120 determines (136) output data corresponding to the subscription, where the output data represents an action to be performed when the triggering event occurs. The system(s) 120 may perform natural language understanding (NLU) processing on text data representing the user input to determine an intent corresponding to the user input. The system(s) 120 may determine that user's intent is to create a subscription to receive data or to cause the system to perform an action in the future in response to an occurrence of an event. The system(s) 120 may determine, using NLU and the text data, the trigger data for executing an action. For example, if the user input is "notify me when I receive an email," the system(s) 120, using NLU, may determine that the intent is to receive a notification in the future, the slot indicating the trigger for receiving the notification is when the user receives an email, and the action to be executed when the user receives an email is to send the user a notification. As another example, the user input may be "turn on the lights when I arrive home," and the system(s) 120, using NLU, may determine that the intent is to perform a smart-home action in the future, the trigger slot is when the user arrives home, and the action to be executed is turning on the lights. As another example, the user input may be "tell me when my prescription is ready," and the system(s) 120, using NLU, may determine that the intent is to receive a notification in the future, the trigger is when the user's prescription is ready, and the action to be executed when the prescription is ready is to send the user a notification.

The system(s) 120 determines (138) the trigger type corresponding to the trigger data. The trigger type may represent a priority indication for the subscription based on the triggering event represented by the trigger data and other data associated with the trigger data and/or the user profile. The priority data may be high, medium-high, medium, medium-low, low, and other variations of priority indicators. In some embodiments, the trigger type may be a numerical value representing the priority data of the subscription, where the numerical value may be between 1 and 5. In some embodiments, the system(s) 120 determines the trigger type based on a category corresponding to the triggering event. For example, the triggering event "receipt of an email" may correspond to the category "correspondence/email." In other examples, the triggering event "prescription is ready" may correspond to the category "medical/health", the triggering event "start of football game" may correspond to the category "event/sporting", the triggering event "when it rains" may correspond to the category "weather condition", the triggering event "hurricane warning" may correspond to the category "severe weather condition", etc. Each category may be assigned a system priority indication, for example, the correspondence/email category may be assigned low, the medical/health may be assigned high, event/sporting may be assigned low, weather condition may be assigned medium, severe weather condition may be assigned high, etc. Using the system priority data the system(s) 120 may determine the trigger type for the subscription. For example, if the user input is "tell me when I receive an email from Joe", the system(s) 120 may determine that the trigger type is low based on the corresponding email/correspondence category having a low priority indication. In another example, if the user input is "tell me when there is a severe weather warning", the system(s) 120 may determine that the trigger type is high based on the corresponding severe weather condition category having a high priority indication.

In some embodiments, using the user input data and/or the user profile data associated with the user 5, the system(s) 120 may determine user-specific priority data for the category and/or the triggering event. The system(s) 120 may adjust the system priority indication based on user preference data, user activity, or other user profile data to determine the user specific priority indication. For example, the user profile data corresponding to the user 5 may include user preference relating to a priority indication for particular triggering events/categories, for example, the user profile data may indicate that the "prescription ready" event is of medium priority. In another example, the user profile data may indicate that the "severe weather condition" event is of medium priority, however, based on the system priority indication being high and based on the severe weather alert affecting the user's location, the system(s) 120 may determine the priority data to be high for a particular severe weather alert triggering event. In some embodiments, the system(s) 120 may use user profile data corresponding to other users to determine the trigger type. For example, if user profile data of other users indicate a high preference for the correspondence/email category to be of high priority, then the system(s) 120 may determine the trigger type for the triggering event "receipt of email" as high.

The system(s) 120 may use data determined from the user input to determine the trigger type. The user input may include an indication of priority or may include other data from which a priority can be derived, for example "it is important that you tell me when I receive an email from Joe" or "Alexa, I ran out of my medicine. Tell me when my prescription is ready," and the system(s) 120, in both cases, may determine the trigger type to be high. In case of a voice input, the system(s) 120 may determine sentiment data representing the user's sentiment/emotion when providing the user input, and may use the sentiment data to determine the trigger type. For example, the user input may be "tell me when I get an email from Joe!" the system(s) 120 may determine sentiment data using the audio data indicating excitement or urgency, and the system(s) 120 may determine the trigger type to be high.

In some embodiments, the trigger type may be based on whether the time of the triggering event is known, determinable or pre-set prior to the event occurrence. For example, the time of when a sporting event or a TV program starts is known or can be determined prior to the start of the sporting event or TV program. In contrast, the time of when a user may receive an email cannot be determined prior to receiving the email. For triggering events where the time is determinable/known prior to the event occurrence, the system(s) 120 determines the trigger type to be a reminder operation. For triggering events where the time cannot be determined prior to the event occurrence, the system(s) 120 may determine the trigger type to be a notification operation.

The system(s) 120 determines (140) an output type for the subscription using the trigger type and the device capability(ies) for an output device. In some embodiments, the user input may specify the output device for the subscription. For example, the user input may be "remind me on my phone when the Seahawks play," and the system(s) 120 may determine that the output device is a device designated as "my phone", "personal phone" or otherwise a smartphone device associated with the user profile for the user 5. In some embodiments, when the user input does not specify the output device for the subscription, the system(s) 120 determines the device that received the user input (e.g., the device 110) to be the output device.

In some embodiments, the user input may not specify the form of output for the subscription. For example, the user input "tell me when I receive an email" does not specify whether the user wants an audio output or a push notification or another type of output. In such cases, the system(s) 120 uses the trigger type to determine the output type. The output type may indicate which form(s) of output (e.g., announcement, push notification, visual notification, audio notification, etc.) are to be used to indicate to the user that the triggering event occurred. The output type may also indicate the timing of presenting the output (e.g., interrupt the user with the output as soon as the event occurs, wait till the user interacts with the system, etc.). The output type may also indicate how many devices associated with the user profile are to receive the output.

If the trigger data indicates a high priority for the triggering event, then the system(s) 120 may determine to announce when the event occurs, for example, by generating synthesized speech. If the trigger type is medium, then the system(s) 120 may determine the output type as a notification, including a push notification, a visual notification (e.g., display text and/or graphical elements on the screen of the output device, cause a light of the output device to turn on, flash or blink, etc.), an audio notification (e.g., a chirp, or other sounds) or other forms of notifications, and may cause multiple devices to output the notification. If the priority is low, then the system(s) 120 may determine the output type is a notification, and may cause one device associated with the user profile to output the notification.

If the trigger type is high, then the output type may indicate the timing of output as presenting it as soon as the event occurs, and may cause one or more devices to turn on to present the output, even if the device was previously off. In some cases, the system(s) 120 may interrupt a user's interaction with the output device to present the output. For example, if the output device is playing music, and an event with a trigger type of high occurs, the system(s) 120 may cause the output device to pause the music and output "There is a severe weather alert in your area." If the trigger type is medium, then the output type may indicate the timing of output such that it is presented after the event occurs when the user interacts with the system, and may not cause any devices that are turned off to turn. For example, the user may turn on or activate an output device, and the system(s) 120 may present the output at that time. If the trigger type is low, then the output type may indicate the timing of output such that it is presented when the user requests to receive any notifications/reminders/or other outputs. For example, the trigger type for the event receipt of an email may be low, when the user receives an email, the system(s) 120 may generate output data, but not send it to an output device for presentation. The user may say or otherwise provide input indicating an intent to receive notifications, for example, "Alexa what are my notifications today?" at which time the system(s) 120 may cause the output device to present the output "you have received an email."

If the trigger type is high, then the system(s) 120 may determine the output type such that it is sent to multiple devices associated with the user profile. If the trigger type is low, then the system(s) 120 may determine the output type such that it is sent to one device associated with the user profile.

The system(s) 120 may determine the output capabilities of the output device to determine the output type for the subscription. The system(s) 120 may assign a higher preference to the ability to output synthesized speech, and if the output device is capable of outputting synthesized speech then set the output type to be an audio output including a TTS output. If the output device is not able to output synthesized speech, then the system(s) 120 may determine if the output device is able to receive push notifications, and set the output type to a push notification. The output type may include audio output, TTS output, push notification, visual notification, or other forms of output a device may be capable of presenting.

The system(s) 120 determines (142) frequency data for executing the subscription. The frequency data indicates the number of times the user wants to receive an output when an event occurs. For example, the user input may be "tell me each time a package is delivered" and the system(s) 120 determines the frequency data to be "each time." As another example, the user input may be "tell me the next two times I receive an email" and the system(s) 120 determines the frequency data to be "two." In some cases, the user input may not specify the number of times the user wants to receive an output for the event occurrence. The system(s)

120 may determine if the triggering event is the type of event that occurs once, occurs for a finite number of times, or occurs for an infinite number of times. If the triggering event occurs once (e.g., opening ceremony for the 2020 Summer Olympics) then the system(s) 120 determines the frequency data to be "one." If the triggering event occurs multiple times, the system(s) 120 may determine the frequency data to be "infinite," and may generate an output each time the event occurs until the user disables or deletes the subscription. In some embodiments, the system(s) 120 may ask the user for further information on how many times the user wants to receive an output when the event occurs, and determine the frequency data using the user's response.

The system(s) 120 stores (144) the subscription data including the trigger data, the output data, the output type, the trigger type, and the frequency data. The subscription data may include other information, such as a user profile identifier, an output device identifier, and other data. The system(s) 120 may use the stored subscription data to determine when an output is triggered and how to present the output to the user.

Figure 2:
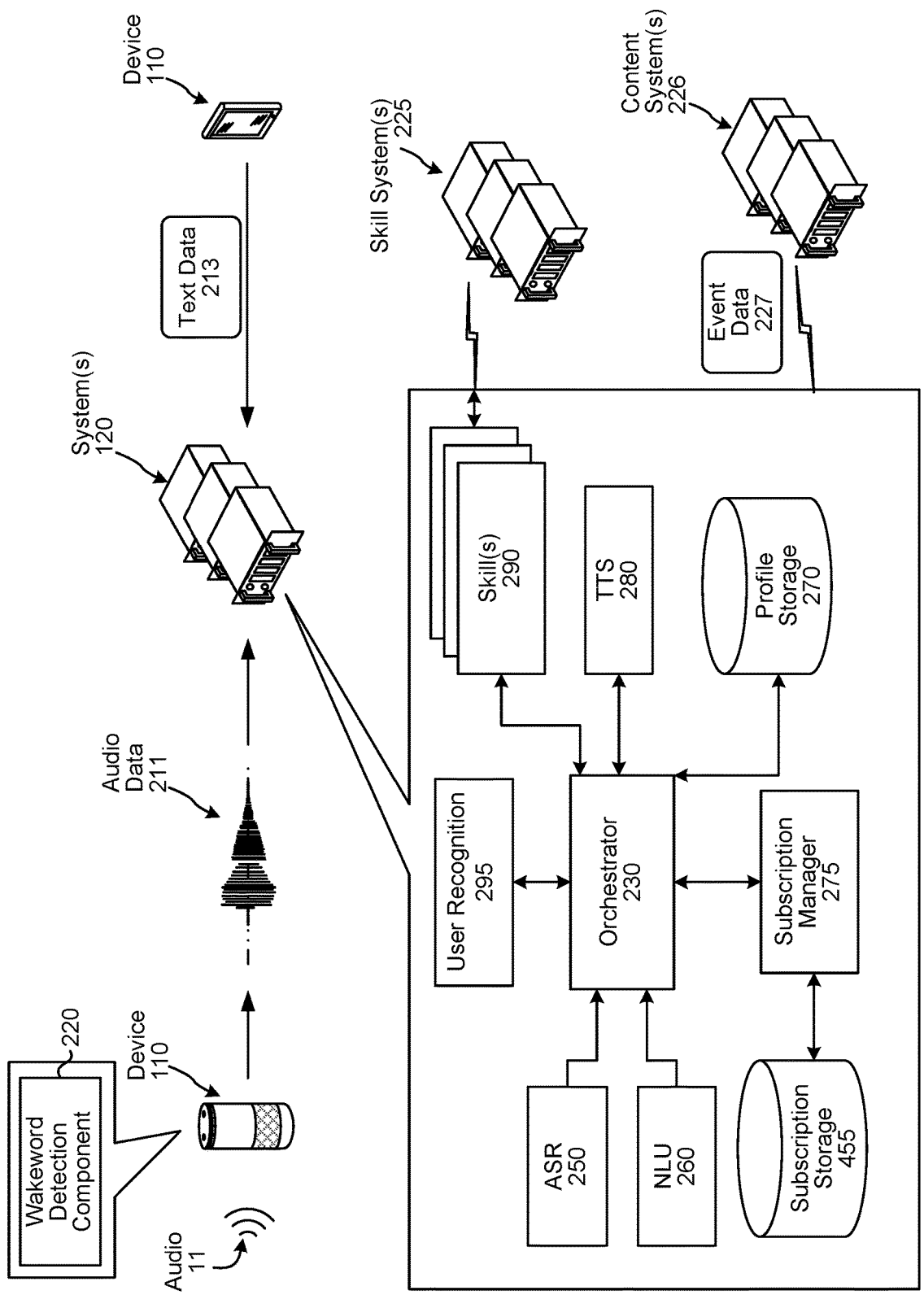
FIG. 2 is a conceptual diagram of components of a system according to embodiments of the present disclosure.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the system(s) 120. Upon receipt by the systems(s) 120, the text data 213 may be sent to the orchestrator component 230, which may send the text data 213 to the NLU component 260. The text data 213 may be derived from an input(s) provided by the user 5 via an application/app on the device 110, where the user 5 may use the application/app to create a subscription (as described in connection with FIG. 1). The text data 213, for example, may be "notify me when I get an email from _____" or "tell me when my prescription for _____ is ready for pickup at the pharmacy."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The subscription storage 455 may include data relating to the subscriptions created for users identified by their respective user profiles. For example, the subscription storage 455 may include trigger information (indicating when a proactive action is to be executed) and action information (indicating the action that is to be executed). The subscription storage 455 may also include information indicating the output type, trigger type and recurrence type.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250 that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 4:
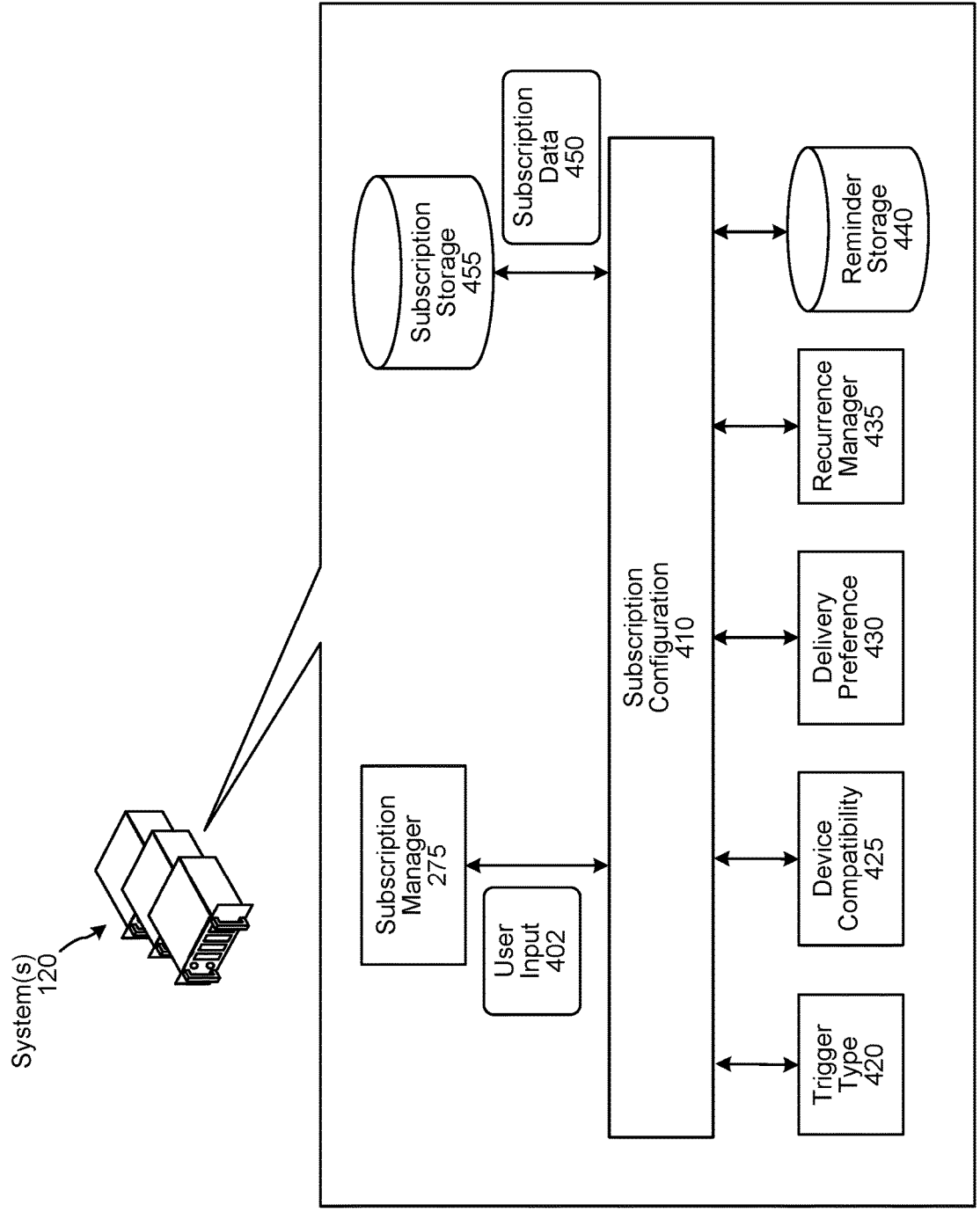
FIG. 4 is a conceptual diagram of system components used to configure a subscription according to embodiments of the present disclosure.

The system(s) 120 may also include the subscription manager 275 that may process a user input to create a subscription for the user, storing the corresponding trigger data and the action data in the subscription storage 455 as described in relation to FIG. 4. The subscription manager 275 may process event trigger(s) from the skill(s) 290 to determine whether a subscribed action is to be executed, and may update recurrence information for the subscription as described in relation to FIG. 5.

One or more content system(s) 226 may be in communication with the system(s) 120 and may provide event data 227. The event data may represent events that occurred. The content system(s) 226 may relate to various systems that provide different types of data, including event data indicating occurrence of a particular event. For example, the content system(s) 226 may be associated with and may provide data related to weather conditions, information relating to sports, email management system, a prescription/medical data system, a package delivery system, and others. The event data 227, for example, may represent a weather condition occurring, an event occurring relating to sports, receipt of an email, indication that a prescription is ready, indication that a package is delivered or will be delivered, etc. As described in relation to FIG. 5, the subscription manager 275 may use the event data 227 to determine that an output according to a subscription is triggered.

In some embodiments, the system(s) 120 may monitor content databases, knowledge databases, information available on the Internet, and other sources of information to determine occurrence of an event, determine a change in content/information, and determine availability of new content/information. The system(s) 120 may generate event data indicating occurrence of an event, a change in content/information or availability of new content/information, when such is detected by the system(s) 120. The system(s) 120 may monitor the various sources of information using a keyword(s) to determine occurrence of an event corresponding to the keyword(s), determine change in content/information corresponding to the keyword(s), and determine availability of new content/information corresponding to the keyword(s). Using the event data, the system(s) 120 may determine that an output (such as an announcement, a push notification, a visual notification, an audible notification, or other types of output) is triggered according to a subscription.

Figure 3:
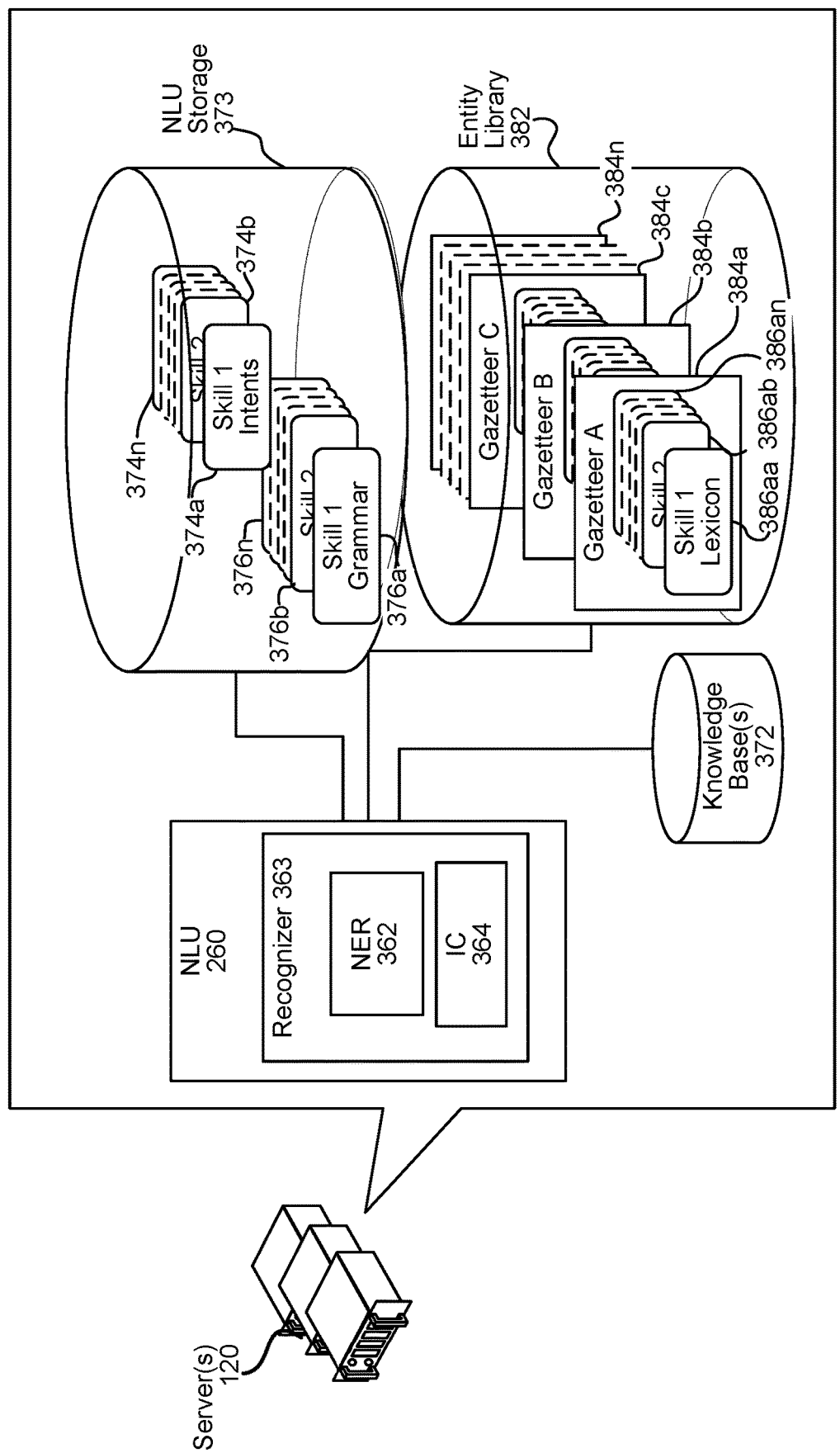
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, skill system(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384*a*) includes skill-indexed lexical information 386*aa* to 386*an*. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, sender name, recipient name, entity name, sports team name, sporting event, weather condition, prescription name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. For example, a subscription intent database may link words and phrases such as "tell me when," "notify me," and "let me know" to a <TellMeWhen> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. For example, a grammar framework 376 corresponding to a <TellMeWhen> intent may correspond to sentence structures such as "Remind me of {TriggerEvent}," "Notify me of {TriggerEvent}," "Remind me of {TriggerEvent} by {Action}," "Notify me of {TriggerEvent} by {Action}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. For example, a grammar model 376 for an intent corresponding to <TellMeWhen> may specify a list of slots applicable to notify the user when the identified "event" occurs (e.g., receipt of email, prescription is ready, a particular weather condition, etc.) and any event modifiers, such as {Email Sender}, {Prescription Name}, {Rain}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. For example, an NER component 362 implemented by a subscription recognizer may parse and tag text data corresponding to "notify me when I receive an email from Joe" as {Verb}: "Notify," {Object}: "email received," {Object Preposition}: "from," and {Object Modifier}: "Joe." The NER component 362 identifies "Notify" as a verb, which an IC component 364 may determine corresponds to a <TellMeWhen> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG. For example, an NER component 362 may tag "Notify me when I receive an email from Joe" as: {domain} Subscription, {intent}<TellMeWhen>, {trigger event} receipt of email, {action} notification, {sender name} "Joe".

FIG. 4 is a conceptual diagram of system components used to configure a subscription according to embodiments of the present disclosure. The system(s) 120 may include the subscription manager 275, a subscription configuration component 410, a trigger type component 420, a device compatibility component 425, a delivery preference component 430 and a recurrence manager 435. The subscription manager 275 may receive a request to create a subscription. As described herein, a subscription refers to a request to perform an action (e.g., receive an output/data/information in the future, cause a device to perform an operation in the future, etc.) by the system when a particular event occurs. A user, such as the user 5 interacting with the device 110, a developer or a skill/experience creator interacting with the system(s) 120 to create/manage a skill and an application, or other types of users, may request the system(s) 120 to create subscriptions. For example, a user may create a subscription to receive a notification, a reminder or another type of output when an event occurs (e.g., when an email is received, when a package is delivered, when a prescription is ready, when a TV show is starting, when a person is at home, etc.). As another example, a user may create a subscription to perform an action when an event occurs, such as, turning on the lights when someone arrives at home, adjust the temperature at home at a particular time, etc.

The system(s) 120 may receive user input data 402 including information (e.g., trigger data indicating when an action is to be performed, action/output data indicating the output to be performed when triggered, etc.) to create a subscription. The system(s) 120 may receive the user input data 402 from the user 5 via the device 110 as a voice input/utterance, a text input, a graphical user interface input, and/or other forms of input. The system(s) 120 may receive the user input data 402 from a skill/application developer or manager to create a subscription for end-users, such as the user 5. The system(s) 120 may determine (using NLU as described above) that the user input relates to creating or managing a subscription, and may send the user input data 402 to the subscription manager 275 for further processing. The subscription manager 275 may determine that the user input data 402 relates to creating a subscription, and may send the user input data 402 to the subscription configuration component 410.

In some embodiments, the user input data 402 may include text data representing a user request to create a subscription. In some embodiments, the user input data 402 may include NLU data/hypothesis(es) corresponding to a user request to create a subscription. In some embodiments, the user input data 402 may include trigger information, output information, device information, user profile information, user preferences, and other data.

The subscription configuration component 410 may process the user input data 402 to create a subscription to perform an action in the future when a particular event occurs. The subscription configuration component 410 may determine, from the user input data 402, trigger data that represents a change in state or occurrence of an event, such as, "email received", "medical prescription ready", "Seahawks are playing", etc. The subscription configuration component 410 may determine, from the user input data 402, output data that represents an action to be performed or an output to be generated when the triggered according to the trigger data. The output data may indicate that a notification is to be generated, a particular device is to be operated/controlled, etc. The subscription configuration component 410 may determine, from the user input data 402, metadata representing other information related to the subscription, such as, trigger type, output type, delivery preference information, frequency/recurrence data, etc.

The trigger type component 420 may process the trigger data to determine a corresponding trigger type. The trigger type may represent a priority indication for the subscription based on the triggering event represented by the trigger data and other data associated with the trigger data and/or the user profile. The trigger type may be high, medium-high, medium, medium-low, low, and other variations of priority indicators. The trigger type may be high, medium-high, medium, medium-low, low, and other variations of priority indicators. In some embodiments, the trigger type may be a numerical value representing the priority of the subscription, where the numerical value may be between 1 and 5. The trigger type component 420 may determine the trigger type based on the category of the triggering event. For example, the triggering event "receipt of an email" may correspond to the category "correspondence/email." In other examples, the triggering event "prescription is ready" may correspond to the category "medical/health", the triggering event "start of football game" may correspond to the category "event/sporting", the triggering event "when it rains" may correspond to the category "weather condition", the triggering event "hurricane warning" may correspond to the category "severe weather condition", etc. Each category may be assigned a system priority indication, for example, the correspondence/email category may be assigned low, the medical/health may be assigned high, event/sporting may be assigned low, weather condition may be assigned medium, severe weather condition may be assigned high, etc.

In some embodiments, the trigger type component 420 may determine the trigger type using the user input and/or user profile data. The user profile data corresponding to the user 5 may include user preference relating to a priority indication for particular triggering events/categories, for example, the user profile data may indicate that the "prescription ready" event is of medium priority. In another example, the user profile data may indicate that the "severe weather condition" event is of medium priority. In some embodiments, the trigger type component 420 may use user profile data corresponding to other users to determine the trigger type. The trigger type component 420 may use data determined from the user input to determine the trigger type. The user input may include an indication of priority or may include other data from which a priority can be derived, for example "it is important that you tell me when I receive an email from Joe" or "Alexa, I ran out of my medicine. Tell me when my prescription ready," and the trigger type component 420, in both cases, may determine the trigger type to be high.

In some embodiments, the trigger type indicates whether the time of the triggering event is known or unknown. In some cases, the time when an event will occur is known because the event occurs at a determinable, pre-set time, for example, when a football game will start, when a TV show will air, when a weather condition will occur, etc. In such cases, the trigger type component 420 determines that the trigger type corresponding to the subscription is a reminder operation. The trigger type component 420 may determine the trigger type to be a reminder operation even if the event time is not published yet or not yet known, but can be determined prior to the event occurring.

In other cases, the time when an event will occur is unknown or cannot be determined in advance of the event occurring, for example, when an email is received, when a medical prescription is ready, when a package is delivered, etc. In such cases, the trigger type component 420 determines that the trigger type corresponding to the subscription is a notification operation.

In some embodiments, the trigger type component 420 may determine the trigger type for a trigger by using stored data indicating the trigger type for particular triggers. For example, the stored data may indicate that a trigger relating to a broadcast event corresponds to a reminder operation, while a trigger relating to receipt of information from a skill or other system corresponds to a notification operation.

The device compatibility component 425 may determine an output type for the subscription based on the trigger type and an output capability(ies) for a device that will be performing the action or presenting the output when the event occurs. In some embodiments, the user input data 402 may specify the output device for the subscription (for example, "notify me on my mobile phone when my prescription is ready," or "turn on the hallway lights when I arrive home"). In some embodiments, the user input data 402 may not specify the output device for the subscription (for example, "tell me when the Seahawks play" or "remind me to close the windows when it rains"). In that case, the device compatibility component 425 may determine the output capabilities of the device (e.g., device 110) that received the request to create the subscription.

In some cases, the device that receives the subscription request may be a voice-enabled device, may be configured to perform spoken language understanding, and may be capable of outputting synthesized speech. In other cases, the device (e.g., a mobile device) that receives the subscription request may include a voice-enabled application that is capable of performing spoken language understanding using a user input, but not capable of outputting synthesized speech. In some cases, the device may need to enable receipt of push notifications from the voice-enabled application.

The device compatibility component 425 may determine whether the output capabilities of the output device for the subscription include the ability to output synthesized speech generated by the TTS processing component 280 described above. The device compatibility component 425 may determine whether the output capabilities of the output device for the subscription include the ability to receive push notifications, the ability to present a visual output (e.g., a light, etc.), or the ability to present other types of outputs. The device compatibility component 425 may determine whether the output device is capable of performing the requested action, such as controlling a smart device as requested by the user.

In some embodiments, the device compatibility component 425 may determine the output type to be an audio output comprising synthesized speech when the output device is capable of outputting synthesized speech. If the output device is not capable of outputting synthesized speech, then the device compatibility component 425 may determine the output type to be a push notification. In some embodiments, the device compatibility component 425 may determine whether the output device is enabled to receive push notifications. If the output device is not capable of outputting synthesized speech, push notifications, or other types of output, then the output type determined by the device compatibility component 425 may be an error or may otherwise indicate that the output device does not support an output. The output types made include audio output, TTS output, visual output, push notification, email message, SMS message, and other forms of output types.

The device compatibility component 425 may determine a set of devices associated with the user profile that are to receive an output according to the subscription. When creating the subscription, the subscription configuration component 410 may associate multiple devices with the subscription data 450 as being potential output devices that are to receive an output when the event occurs. The form of output for each device may also be stored. For example, the device compatibility component 425 may determine the potential output devices and their respective output form to be a smart speaker device 110a: TTS output, a smart phone 110b: push notification, smart watch 110c: visual/light notification, display device 110f: TTS output and visual notification, etc. When executing the subscription (when event data is received indicating that triggering event is occurred), the subscription manager 275 may determine which devices of the potential output devices may receive the output. In some cases, all of the potential output devices may receive the output, and in some cases only one of the potential devices may receive the output. The subscription manager 275 may use various factors to make this determination, including, but not limited to, presence data (indicating the user is proximate to one or more device at the time the output is to be presented), location data (indicating the user's location (e.g., home versus work)), interaction data (indicating the user is interacting with a particular device when the output is to be presented), and other factors. These factors may indicate that the user is more likely to receive/view/access the output if presented at the particular device.

The output type may indicate which form(s) of output (e.g., announcement, push notification, visual notification, audio notification, etc.) are to be used to indicate to the user that the triggering event occurred. The output type may also indicate the timing of presenting the output (e.g., interrupt the user with the output as soon as the event occurs, wait till the user interacts with the system, etc.). The output type may also indicate how many devices associated with the user profile are to receive the output.

The delivery preference component 430 may determine how the output is presented when the event is triggered based on preference(s) defined by the user, skill/application developer, or the system. For example, the profile storage 270 may include data indicating a user's preference of receiving notifications or reminders at a particular device associated with the user profile. The delivery preference component 430 may determine which device(s) to send the output to when the subscription is triggered, the type/form of the output, and other information related to presenting the output to the user. For example, a developer may specify that an output for a particular subscription is to be presented as a push notification, rather than an audio output/announcement. As another example, a system preference may specify that an output for a particular subscription cannot be presented via a device that is associated with a child user or that is designated as a child's device (by the user, the manufacturer, the system, etc.).

The recurrence manager 435 may determine frequency data representing the number of times an output is to be generated or an action is to be performed. Some events may occur multiple times, such as, receiving an email from a particular sender, a score change in a football game, a weather condition, a package delivery, etc. The user input data 402 may indicate the number of times an output (e.g., a notification, a reminder, an announcement, etc.) is to be presented. For example, a user input may be "tell me the next time I receive an email from Joe", "remind me to close the windows every time it rains this week", "notify me the next two times I receive a package delivery", etc. The recurrence manager 435 may process the user input data 402 to determine the frequency data. In the example of "tell me the next time I receive an email from Joe," the recurrence manager 435 determines the frequency data as one or one-time occurrence. In the example of "remind me to close the windows every time it rains this week," the recurrence component 425 determines the frequency data as recurring for the next seven days. In some embodiments, the recurrence manager 435 may determine the number of times the weather forecasts rain at the user's location for the week, and may determine the frequency data as being the number of times it may rain that week. In the example of "notify me the next two times I receive a package delivery," the recurrence component 435 may determine the frequency data to be two times/twice/two.

In some embodiments, the NLU component 260 may determine the frequency data by processing the user input to determine how many times the user intends to receive an output. The recurrence component 435/the NLU component 260 may determine the frequency data by identifying words in the user input that indicate a time period. Such words may include, but are not limited to, when, every time, the next N times, each time, whenever, for the next N days, the next time, the next one time, etc.

In some embodiments, the recurrence manager 435 may determine that the triggering event only occurs once or only occurs once during a given time period. For example, a triggering event like the opening ceremony for the 2020 Summer Olympics (e.g., the user input may be "remind me when the opening ceremony for the Olympics starts") occurs once during a given finite time period, such as within the year or the month. In such cases, the recurrence manager 435 may determine the frequency data as one/once/one time.

In some embodiments, the recurrence manager 435 may determine the frequency data using user profile data, user preferences, past user interactions, past subscriptions, similar subscriptions for different users, and other data.

In some embodiments, if the recurrence manager 435 is unable to determine, with a certain level of confidence, the frequency data for the subscription, then the system(s) 120 may ask the user the number of times the subscription is to be executed, or confirm with the user a number of times the subscription is to be executed. For example, the system(s) 120 may output, via synthesized speech or display text/dialog box, "how many times do you want to be notified" or "I will notify you the next one time you receive a package" and the like.

The data determined by the components 420, 425, 430, and 435 and the trigger data and output data determined by the subscription configuration component 410 is stored as the subscription data 450 in the subscription storage 455. The subscription data 450, in some embodiments, may include a user profile identifier(s) to identify which user profile(s) are to receive the output when the subscription is triggered. The subscription data 450 may include a device identifier to identify which device is to receive the output when the subscription is triggered. The example data that may be included in the subscription storage 455 is shown in FIG. 6. As shown, the subscription storage 455 may store different types of subscription data 450 relating to multiple subscriptions, each associated with or including, different types of trigger data, different types of trigger type, different types of output type, different types of recurrence/frequency data, and different types of user profile identifier.

In some embodiments, if the trigger type is a reminder operation, then the subscription configuration component 410 may store the subscription data 450 in the reminder storage 440. The output generated for a reminder subscription/operation may be available to other components or to the user at a later time. For a reminder subscription, the subscription manager 275 may generate an output when an event occurs and present to the user via an output device once. The user may snooze or otherwise indicate to not delete/dismiss the output/reminder, and the system(s) 120 may present the output/reminder for the event to the user again at a later time. The reminder storage 440 may store data indicating that the user snoozed the reminder output, and may cause the system(s) 120 to present the reminder output again after a period of time or when the user requests to view/hear his active or snoozed reminders. For example, the system(s) 120 may cause a device to output "the Seahawks game starts in 10 minutes," the user may snooze the reminder, and the system(s) 120 may at a later time output "reminder the Seahawks game has started." In another example, the initial reminder output may be provided via a first output device, a smart speaker, the user may request to view his reminders via a second device, a mobile device, and the system(s) 120 in response may present the reminder output via the second device.

In some embodiments, if the trigger type is a notification operation, then the subscription manager 275 may present an output generated for the notification subscription/operation only one time, rather than continuing to remind the user of the event occurrence.

In some embodiments, the subscription configuration component 410 may determine filter data and entity values corresponding to the subscription by processing the user input data 402. The filter data and the entity values may be stored as the subscription data 450. The filter data may represent data or information that can be used to identify the triggering event for the subscription. The entity value may indicate one or more entities associated with the triggering event. For example, if the user input is "tell me I receive an email from Joe", the filter data may include an email address associated with Joe and the entity value may include "Joe." So that when an email from Joe is received, the subscription manager 275 may use the email address and the entity value "Joe" to recognize that an output according to a subscription associated with this event is to be generated. As another example, if the user input is "notify me when my Asthma prescription is ready," the filter data may a user identifier associated with the user's medical information/prescription, and the entity value may be "Asthma." As another example, if the user input is "remind me when the Seahawks play," the filter data may be a TV program identifier associated with the football game and the entity value may be "Seahawks."

In some embodiments, the system(s) 120 may generate an output confirming creation of the subscription. The subscription manager 275 may generate an output that includes information related to the subscription to inform the user that the subscription was created successfully. The confirmation output may be based on and/or may include the output type, the trigger data, the output data, the device identifier, recurrence information, etc. For example, once the subscription is created, the subscription manager 275 may present the following output: "I will notify you when you receive an email from Joe." In some cases, the subscription manager 275 may generate an output requesting the user to provide more information or to perform an action to facilitate creation of the subscription. For example, if the recurrence manager 435 is unable to determine the frequency data for the subscription, then the subscription manager 275 may present the following output: "Do you want to be notified each time you receive an email from Joe?" As another example, if the device compatibility component 425 determines that the output device does not support an output according to the subscription, then the subscription manager 275 may generate the following output: "This device does not support notifications." The confirmation output may be generated using natural language generation techniques described in connection with FIGS. 7A and 7B as part of the functionalities performed by the TTS component 280.

The output generated by the subscription manager 275 may be provided to the orchestrator 230 for output to the device 110. The output may be processed by the TTS component 280 to generate synthesized speech if the device that received the subscription request is capable of outputting synthesized speech and/or audio data. The output may be displayed as text data or in another form at the device that received the subscription request.

The system(s) 120 may receive a user input in response to the system presenting the confirmation of the subscription being created, where the user input may indicate a change to the created subscription. For example, if the system presents the confirmation "I will announce it when you receive an email from Joe," the user may respond "No, send me a notification on my phone instead" or the user may provide input in another form (e.g., text, selection of option via a graphical user interface, etc.) indicating that the user wants to receive a notification on a mobile device instead of the announcement. The subscription manager 275 then updates the corresponding subscription data 450 accordingly to indicate an output type of push notification and a device identifier corresponding to the user's mobile device.

Further non-limiting examples of the confirmation output that the system(s) 120 may present to the user are described below. In one example, if the user input is "tell me when I get an email from Joe," and the output device is capable of outputting synthesized speech, then the subscription configuration component 410 may create a notification subscription (because time of occurrence is not determinable) with frequency data set to 'one-time', and the subscription manager 275 may output the confirmation "I'll announce it when you get an email from Joe."

In another example, if the user input is "tell me every time I get an email from Joe," and the output device is capable of outputting synthesized speech, then the subscription configuration component 410 may create a notification subscription (because time of occurrence is not determinable) with frequency data set to 'recurring/each time', and the subscription manager 275 may output the confirmation "I'll announce it whenever you get an email from Joe."

In another example, if the user input is "tell me when I get an email from Joe," and the output device is not capable of outputting synthesized speech and is enabled to receive push notifications, then the subscription configuration component 410 may create a notification subscription with frequency data set to 'one-time', and the subscription manager 275 may output the confirmation "I'll notify you when you get an email from Joe."

In another example, if the user input is "tell me when I get an email from Joe," and the output device is not capable of outputting synthesized speech and is disabled to receive push notifications, then prior to creating the subscription, the subscription manager 275 may output the request "To receive notification, please enable push notifications for the app."

In another example, if the user input is "tell me when I get an email from Joe," and the output device is not capable of outputting synthesized speech and not capable of receiving push notifications (e.g., a smart TV or an input-only device), then the subscription configuration component 410 may not create the subscription, and the subscription manager 275 may output "The device does not support announcements or notifications."

In another example, if the user input is "tell me when the Seahawks play," and the output device is capable of outputting synthesized speech, then the subscription configuration component 410 may create a reminder subscription (because time of occurrence is determinable) with frequency data set to 'one-time', and the subscription manager 275 may output the confirmation "I'll remind you when the Seahawks plays."

In another example, if the user input is "tell me when the Seahawks play," and the output device is not capable of outputting synthesized speech and is enabled to receive push notifications, then the subscription configuration component 410 may create a reminder subscription with frequency data set to 'one-time', and the subscription manager 275 may output the confirmation "I'll remind you when the Seahawks plays."

In another example, if the user input is "tell me when the Seahawks play," and the output device is not capable of outputting synthesized speech and is disabled to receive push notifications, then the subscription configuration component 410 may create a reminder subscription with frequency data set to 'one-time', and the subscription manager 275 may output the confirmation "To receive notification, please enable push notifications for the app."

Figure 5:
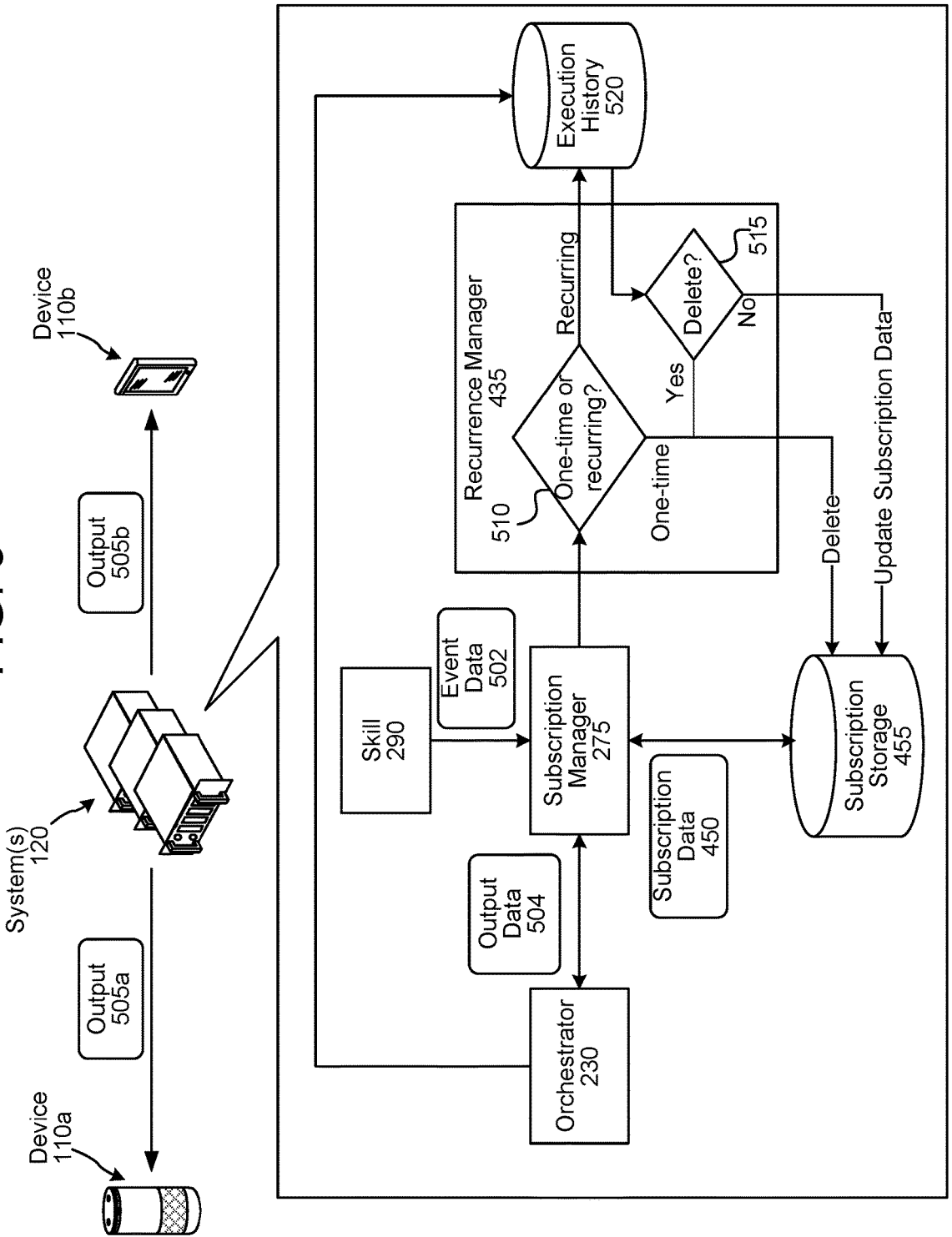
FIG. 5 is a conceptual diagram of system components used to execute a subscription according to embodiments of the present disclosure.

FIG. 5 is a conceptual diagram of system components used to execute a subscription according to embodiments of the present disclosure. A skill component 290 may provide event data 502 to the subscription manager 275 (directly or via the orchestrator 230). The event data 502 may indicate occurrence of an event, such as, receiving an email, prescription ready for pickup, score change/update in a football game, etc. The subscription manager 275 may retrieve subscription data 450 from the subscription storage 455 and determine that the event data 502 triggers an output according to a subscription. The subscription manager 275 may generate output data 504, as determined using the subscription data. The output data 504 may include content data representing the content/information to be presented to the user or representing the action to be performed. The output data 504 may also include a device identifier associated with the output device that is to receive the output data. The output data 504 may also include the output type (e.g., TTS, push notification, audio, visual, etc.) for how the output is to be presented to the user.

The subscription manager 275 may send the output data 504 to the orchestrator 230 for further processing so that the output can be presented to the user in response to the subscription being triggered. The system(s) 120, using one or more components described in connection with FIG. 2, may determine the output 505 to send to the device 110 for presentation to the user. For example, the output data 504 may indicate that audio data including synthesized speech is to be sent to a smart speaker device associated with the user profile, and the system(s) 120 may send the output 505a including audio data to the device 110a. In another example, the output data 504 may indicate that a push notification is to be sent to a mobile device associated with the user profile, and the system(s) 120 may send the output 505b including notification data to the device 110b. In another example, the output data 504 may indicate that a visual indication is be sent to a smart speaker device associated with the user profile, and the system(s) 120 may send the output 505a including an instruction to present the visual indication (e.g., a yellow light ring) to the device 110a. The orchestrator 230 may send confirmation to the subscription manager 275 that the output/action for the subscription was completed. The orchestrator 230 may store execution data in execution history storage 520. The execution data may be associated with the user profile (with respect to which the output was presented) and may represent information relating to the execution of the stored subscription. The execution data may include an indication that the subscription was executed, a time when the subscription was executed, and other data.

After receiving confirmation from the orchestrator 230, the subscription manager 275 may determine, using the recurrence manager 435, if the subscription is to be deleted or disabled. The subscription manager 275 may determine to delete a subscription (at least with respect to the user profile) if the frequency of the subscription is one-time. If the frequency of the subscription is recurring, then the subscription manager 275 may update the subscription storage 455 accordingly.

The recurrence manager 435 may determine, using the frequency data/subscription data 450, if the subscription is a one-time execution or a recurring execution (decision component 510). If the subscription is determined to be a one-time execution, then the recurrence manager 435 may delete the corresponding subscription data record from the subscription storage 455. In some embodiments, the corresponding subscription data record may be indicated as disabled, completed, or executed.

If the subscription is determined to be a recurring execution, then the recurrence manager 435 may retrieve data from the execution history storage 520 indicating if the subscription was executed. The recurrence manager 435 may determine whether the subscription was executed recently or within a given time period (to ensure that a previous execution of the subscription is not considered). After determining that the subscription was executed, the recurrence manager 435 may determine (decision component 515), using the frequency data corresponding to the subscription, that the subscription has been executed for the number of times indicated by the frequency data, and the corresponding subscription data record can be deleted/disabled. The recurrence manager 435 may determine, using the frequency data, that the subscription still needs to be executed in the future, and may update the frequency data for the corresponding subscription data record to reflect the number of times remaining for the subscription to be executed. For example, if the user input is "tell me the next 3 times I receive a package delivery," at time of creation of the subscription the frequency data may be "three." After the first time the user is notified of the package delivery, the recurrence manager 435 may update the frequency data for the corresponding subscription data record to "two" to indicate that the user to be notified two more times of a package delivery. After the third time the user is notified of the package delivery, the recurrence manager 435 may delete/disable the corresponding subscription data record.

In some embodiments, the recurrence manager 435 may determine, using data stored at the execution history storage 520, the number of times the subscription is executed. The recurrence manager 435 may check the data at storage 520 that is stored after the subscription is created. Using this information, the recurrence manager 435 may determine to delete or update the subscription data record to indicate whether the system should continue to generate an output for the subscription in the future.

The example subscription data for various subscriptions that may be included in the subscription storage 455 is shown in FIG. 6. For example, for a first subscription represented by the data record 602, the user input may be "tell me urgently when I receive an email from Joe", and the subscription data, as shown, may be <user identifier=ABC>; <trigger=EmailReceived>; <trigger type=high>; <recurrence=once>; <output device=smart speaker>; <output type=audio/TTS>. For an example second subscription represented by the data record 604, the user input may be "notify me the next two times my prescription is ready", and the subscription data, as shown, may be <user identifier=ABC>; <trigger=PrescriptionReady>; <trigger type=medium>; <recurrence=twice>; <output device=mobile device>; <output type=push notification>. For an example third subscription represented by the data record 606, the user input may be "remind me for the next two weekends when the Seahawks play", and the subscription data, as shown, may be <user identifier=BCD>; <trigger=SportsStart>, <trigger type=low>; <recurrence=next two Saturdays and Sundays>; <output device1=Smart TV>; <output type1=error>; <output device2=mobile device>; <output type2=push notification>. For an example fourth subscription represented by the data record 608, the user input may be "tell me when it rains this week", and the subscription data, as shown, may be <user identifier=CDE>; <trigger=WeatherCondition>; <trigger type=medium>; <recurrence=each time for 7 days>; <output device=smart speaker>; <output type=visual notification>. For an example fifth subscription represented by the data record 610, the user input may be "notify me whenever there are server weather alerts in my area", and the subscription data, as shown, may be <user identifier=CDE>; <Trigger=SevereWeatherAlert>; <trigger type=high>; <recurrence=each time>; <output device1=smart speaker>; <output type1=audio/TTS>; <output device2=mobile device>; <output type2=push notification>.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 7A:
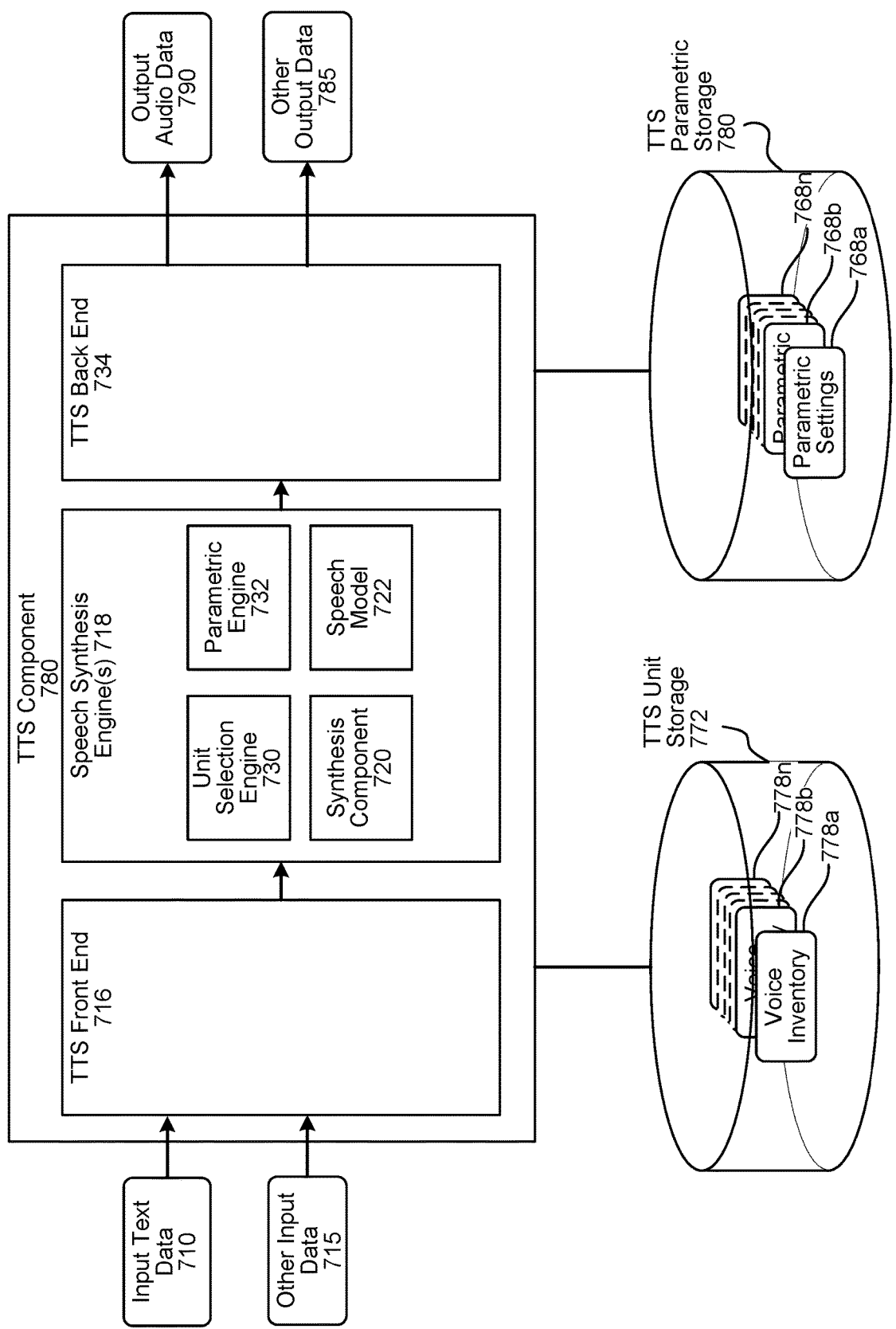
FIG. 7A is a conceptual diagram of text-to-speech components according to embodiments of the present disclosure.

Components of a system that may be used to perform unit selection, parametric TTS processing, and/or model-based audio synthesis are shown in FIG. 7A. As shown in FIG. 7A, the TTS component/processor 780 may include a TTS front end 716, a speech synthesis engine 718, TTS unit storage 772, TTS parametric storage 780, and a TTS back end 734. The TTS unit storage 772 may include, among other things, voice inventories 778$a$-288$n$ that may include pre-recorded audio segments (called units) to be used by the unit selection engine 730 when performing unit selection synthesis as described below. The TTS parametric storage 780 may include, among other things, parametric settings 768$a$-268$n$ that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine

718 may be located within the TTS component 780, within the memory and/or storage of the server 120, device 110, or within an external device.

Text data 710 input into the TTS component 780 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 780 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 780 to craft a natural-sounding audio waveform output. The language dictionary may also include letter-to-sound rules and other tools that may be used to pronounce previously unidentified words or letter combinations that may be encountered by the TTS component 780. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 780. Such acoustic features may include syllable-level features, word-level features, emotion, speaker, accent, language, pitch, energy, duration, and the like. Application of acoustic features may be based on prosodic models available to the TTS component 780. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 790 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 780 may be configured to perform TTS processing in multiple languages. For each language, the TTS component 780 may include specially configured data, instructions and/or components to synthesize speech in the desired language(s). To improve performance, the TTS component 780 may revise/update the contents of the TTS storage 780 based on feedback of the results of TTS processing, thus enabling the TTS component 780 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 780 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 780 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMIs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMI and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the synthesis component 720 may process the audio data for that unit to create a modified unit audio data. The modified unit audio data may then be concatenated to form the output audio data 790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data 790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 790 may include other output data 785 that may include a prosody tag or other indicator that instructs the device 110 to slow down the playback of the output audio data 790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

Figure 7B:
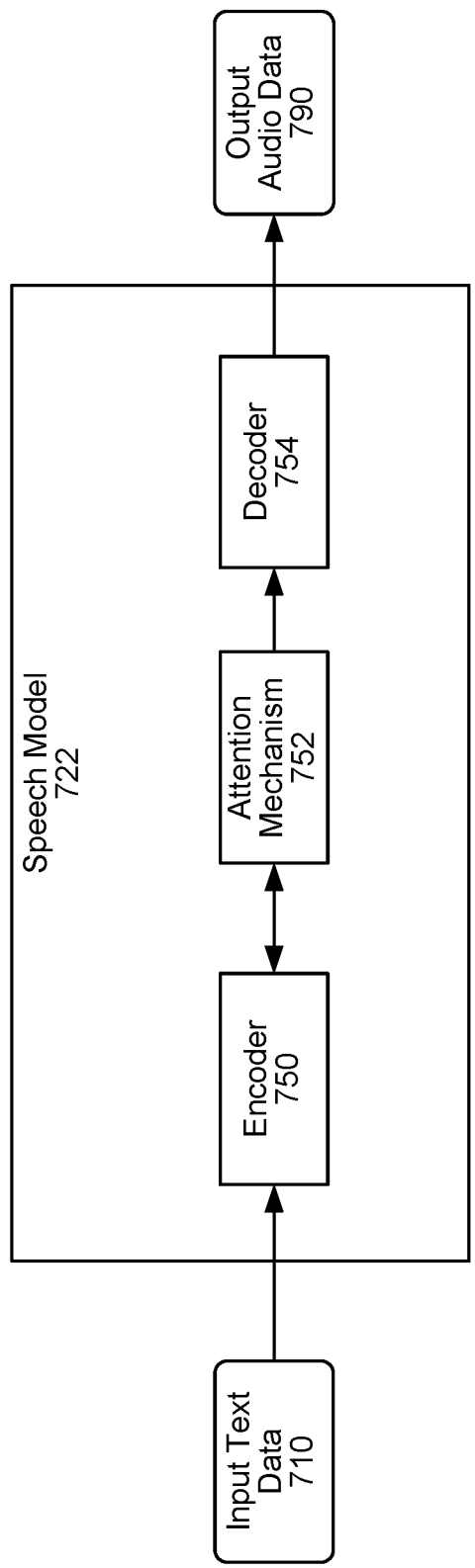
FIG. 7B is a conceptual diagram of a speech model according to embodiments of the present disclosure.

FIG. 7B illustrates an embodiment of the speech model 722. The speech model may include an encoder 750, attention mechanism 752, and a decoder 754. This arrangement of components may be referred to as a sequence-to-sequence model. The encoder 750 and/or decoder 754 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

As descried herein, the interaction determination component 296 determines an interaction score 760. The encoder 750 may receive this interaction score 760, as well as input text data 710 corresponding to input data from the device 110 and/or the NLU result data 685. The encoder 750 may encode this information into a context vector, which is input to the decoder 754. Optionally, an attention mechanism 752 may receive this context vector as well as outputs of other nodes of the encoder 750 and weight (e.g., "attend") different outputs of the encoder 750 differently. The decoder 754 may then generate output audio data 790 (which may include the response data) using the context vector and/or output of the attention mechanism 752.

Figure 8:
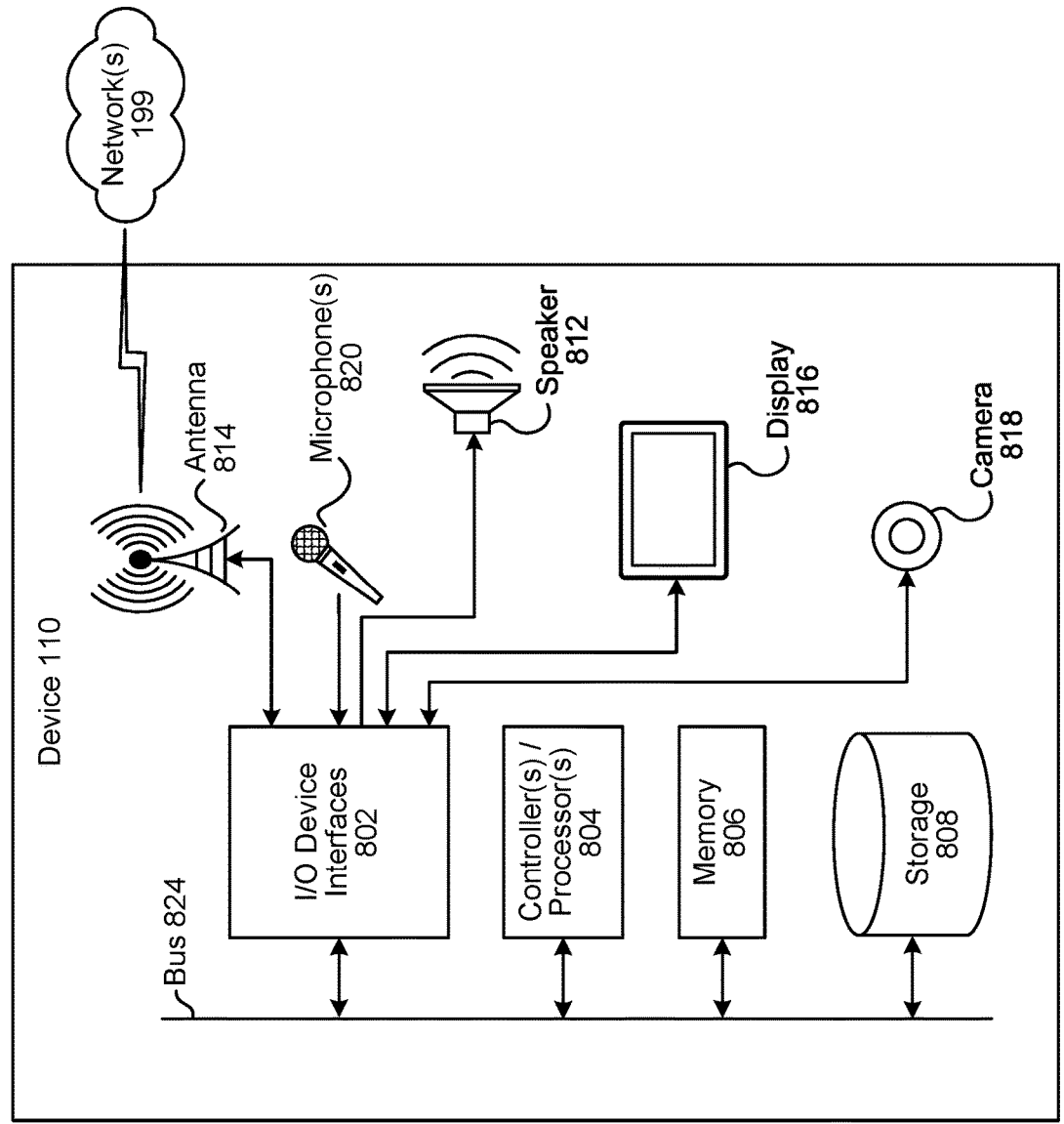
FIG. 8 is a block diagram conceptually illustrating example components of a device according to embodiments of the present disclosure.
Figure 9:
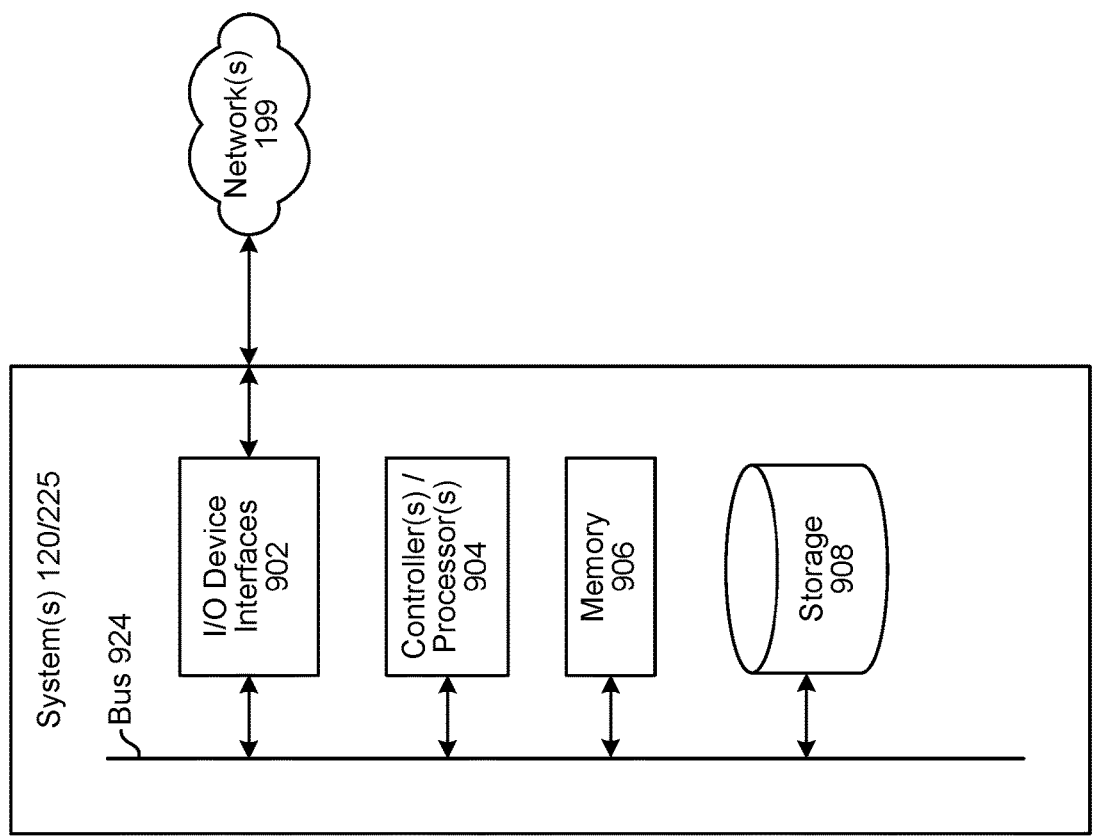
FIG. 9 is a block diagram conceptually illustrating example components of a system according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (802/902), processor(s) (804/904), memory (806/906), and/or storage (808/908) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10:
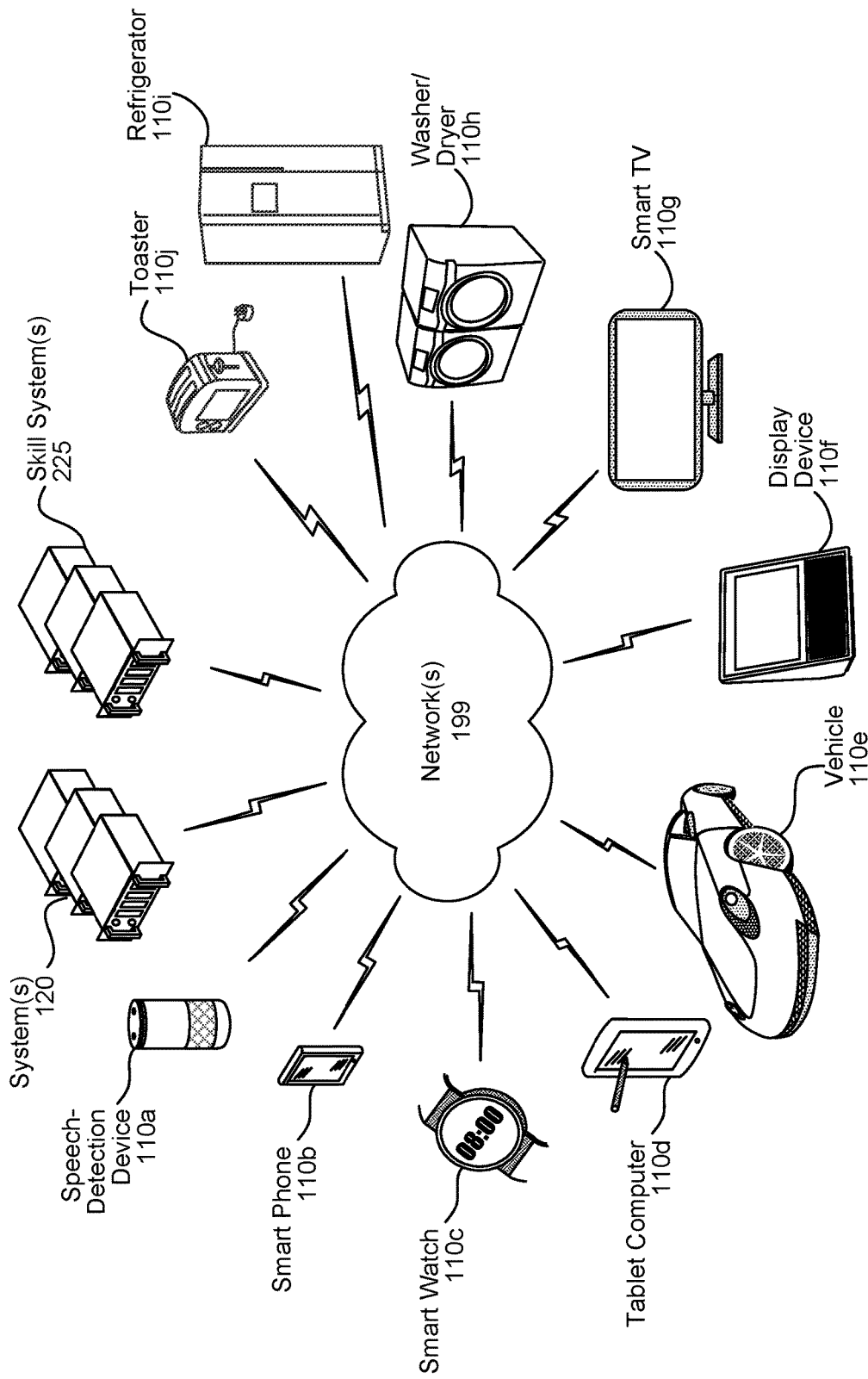
FIG. 10 illustrates an example of a computer network for use with the speech processing system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving input data associated with a user profile;
processing the input data to determine to cause an output in response to an event at a future time;
determining sentiment data representing a sentiment corresponding to the event;
determining, using the sentiment data, first data representing the event;
determining a priority based on the sentiment data;
using the priority to determine at least one of a timing or output type for causing the output; and
associating the first data and the priority with the user profile.

2. The computer-implemented method of claim 1, wherein the input data represents a natural language input and the method further comprises:
processing the input data to determine a command to cause the output when the event occurs.

3. The computer-implemented method of claim 1, wherein the first data represents an action to be performed in response to the event and the method further comprises:
performing the action in response to occurrence of the event, wherein the action is performed based on the priority.

4. The computer-implemented method of claim 1, wherein the input data comprises audio data representing an utterance and the method further comprises:
processing the audio data to determine the sentiment data.

5. The computer-implemented method of claim 1, further comprising:
determining the sentiment data corresponds to excitement; and
in response to the sentiment data corresponding to excitement, determining that the priority is high.

6. The computer-implemented method of claim 1, wherein the input data represents a natural language input and the method further comprises:
performing language processing on the input data to determine language processing data,
wherein determining the priority is further based at least in part on the language processing data.

7. The computer-implemented method of claim 1, wherein the input data includes second data corresponding to past user interactions corresponding to the user profile and the method further comprises processing the second data to determine to cause the output.

8. The computer-implemented method of claim 1, further comprising:
receiving event data indicating occurrence of the event;
determining an output device corresponding to the user profile, wherein the output device is outputting content; and based at least on the priority, sending a command to the output device to interrupt output of the content to present the output corresponding to the event.

9. The computer-implemented method of claim 1, further comprising:
   receiving further input data representing user activity;
   determining a second priority based on the user activity; and
   associating the first data and the second priority with the user profile.

10. The computer-implemented method of claim 1, wherein the output type includes at least one of text notification, text-to-speech notification, push notification, visual notification, or audio notification.

11. A system comprising:
   at least one processor; and
   at least one memory comprising instructions that, when executed by the at least one processor, cause the system to:
      receive input data associated with a user profile;
      process the input data to determine to cause an output in response to an event at a future time;
      determine sentiment data representing a sentiment corresponding to the event;
      determine, using the sentiment data, first data representing the event;
      determine a priority based on the sentiment data;
      use the priority to determine at least one of a timing or output type for causing the output; and
      associate the first data and the priority with the user profile.

12. The system of claim 11, wherein the input data represents a natural language input and wherein the at least one memory further comprises instructions that, when executed by the at least one processor, further cause the system to:
   process the input data to determine a command to cause the output when the event occurs.

13. The system of claim 11, wherein the first data represents an action to be performed in response to the event and wherein the at least one memory further comprises instructions that, when executed by the at least one processor, further cause the system to:
   perform the action in response to occurrence of the event, wherein the action is performed based on the priority.

14. The system of claim 11, wherein the input data comprises audio data representing an utterance and wherein the at least one memory further comprises instructions that, when executed by the at least one processor, further cause the system to:
   process the audio data to determine the sentiment data.

15. The system of claim 11, wherein the at least one memory further comprises instructions that, when executed by the at least one processor, further cause the system to:
   determine the sentiment data corresponds to excitement; and
   in response to the sentiment data corresponding to excitement, determine that the priority is high.

16. The system of claim 11, wherein the input data represents a natural language input and wherein the at least one memory further comprises instructions that, when executed by the at least one processor, further cause the system to:
   perform language processing on the input data to determine language processing data,
   wherein determination of the priority is further based at least in part on the language processing data.

17. The system of claim 11, the input data corresponds to past user interactions corresponding to the user profile.

18. The system of claim 11, wherein the at least one memory further comprises instructions that, when executed by the at least one processor, further cause the system to:
   receive event data indicating occurrence of the event;
   determine an output device corresponding to the user profile, wherein the output device is outputting content; and
   based at least on the priority, send a command to the output device to interrupt output of the content to present the output corresponding to the event.

19. The system of claim 11, wherein the at least one memory further comprises instructions that, when executed by the at least one processor, further cause the system to:
   receive further input data representing user activity;
   determine a second priority based on the user activity; and
   associate the first data and the second priority with the user profile.

20. The system of claim 11, wherein the output type includes at least one of text notification, text-to-speech notification, push notification, visual notification, or audio notification.

* * * * *